(12) United States Patent
Alperovitch et al.

(10) Patent No.: US 9,106,680 B2
(45) Date of Patent: Aug. 11, 2015

(54) SYSTEM AND METHOD FOR PROTOCOL FINGERPRINTING AND REPUTATION CORRELATION

(75) Inventors: Dmitri Alperovitch, Atlanta, GA (US); Zheng Bu, Fremont, CA (US); David Frederick Diehl, Minneapolis, MN (US); Sven Krasser, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 959 days.

(21) Appl. No.: 13/170,163

(22) Filed: Jun. 27, 2011

(65) Prior Publication Data
US 2012/0331556 A1    Dec. 27, 2012

(51) Int. Cl.
G06F 21/55    (2013.01)
H04L 29/06    (2006.01)

(52) U.S. Cl.
CPC ........ *H04L 63/1408* (2013.01); *H04L 63/0227* (2013.01); *H04L 63/14* (2013.01); *H04L 63/1416* (2013.01); *H04L 63/0236* (2013.01); *H04L 63/0245* (2013.01)

(58) Field of Classification Search
CPC . H04L 63/0227; H04L 63/0236; H04L 63/14; H04L 63/1416; H04L 63/1425; H04L 63/1408; H04L 63/0245
USPC .......................................... 726/11, 13, 23, 24
See application file for complete search history.

(56) References Cited

U.S. PATENT DOCUMENTS

| | | | |
|---|---|---|---|
| 5,970,066 A * | 10/1999 | Lowry et al. ................ | 370/353 |
| 5,987,610 A | 11/1999 | Franczek et al. | |
| 6,073,142 A | 6/2000 | Geiger et al. | |
| 6,460,050 B1 | 10/2002 | Pace et al. | |
| 7,305,709 B1 | 12/2007 | Lymer et al. | |
| 7,415,727 B1 | 8/2008 | Lowe et al. | |
| 7,506,155 B1 | 3/2009 | Stewart et al. | |
| 7,555,776 B1 | 6/2009 | Lymer et al. | |

(Continued)

FOREIGN PATENT DOCUMENTS

| | | |
|---|---|---|
| JP | 2009-296036 | 12/2009 |
| JP | 2010-079901 | 4/2010 |

(Continued)

OTHER PUBLICATIONS

Davis, Tom—Utilizing Entropy to Identify Undetected Malware. Guidance Software 2009. http://image.lifeservant.com/siteuploadfiles/VSYM/99B5C5E7-8B46-4D14-A53EB8FD1CEEB2BC/43C34073-C29A-8FCE-4B653DBE35B934F7.pdf.*

(Continued)

*Primary Examiner* — Nadia Khoshnoodi
*Assistant Examiner* — Ngoc D Nguyen
(74) *Attorney, Agent, or Firm* — Patent Captial Group

(57) ABSTRACT

A method is provided in one example embodiment that includes generating a fingerprint based on properties extracted from data packets received over a network connection and requesting a reputation value based on the fingerprint. A policy action may be taken on the network connection if the reputation value received indicates the fingerprint is associated with malicious activity. The method may additionally include displaying information about protocols based on protocol fingerprints, and more particularly, based on fingerprints of unrecognized protocols. In yet other embodiments, the reputation value may also be based on network addresses associated with the network connection.

31 Claims, 3 Drawing Sheets

(56) References Cited

U.S. PATENT DOCUMENTS

| | | | |
|---|---|---|---|
| 7,680,890 B1 | 3/2010 | Lin | |
| 7,681,032 B2* | 3/2010 | Peled et al. | 713/154 |
| 7,712,134 B1* | 5/2010 | Nucci et al. | 726/23 |
| 7,870,203 B2 | 1/2011 | Judge et al. | |
| 7,937,480 B2 | 5/2011 | Alperovitch et al. | |
| 7,953,814 B1 | 5/2011 | Chasin et al. | |
| 8,042,181 B2 | 10/2011 | Judge | |
| 8,045,458 B2 | 10/2011 | Alperovitch et al. | |
| 8,069,481 B2 | 11/2011 | Judge | |
| 8,132,250 B2 | 3/2012 | Judge et al. | |
| 8,201,257 B1 | 6/2012 | Andres et al. | |
| 8,239,915 B1 | 8/2012 | Satish et al. | |
| 8,341,724 B1* | 12/2012 | Burns et al. | 726/13 |
| 8,381,289 B1 | 2/2013 | Pereira et al. | |
| 8,621,618 B1* | 12/2013 | Ramsey et al. | 726/22 |
| 2004/0047356 A1 | 3/2004 | Bauer | |
| 2005/0021740 A1 | 1/2005 | Bar et al. | |
| 2006/0015561 A1 | 1/2006 | Murphy et al. | |
| 2006/0015563 A1 | 1/2006 | Judge et al. | |
| 2006/0031314 A1 | 2/2006 | Brahms et al. | |
| 2006/0253447 A1 | 11/2006 | Judge | |
| 2006/0253458 A1 | 11/2006 | Dixon et al. | |
| 2006/0253579 A1 | 11/2006 | Dixon et al. | |
| 2006/0253581 A1 | 11/2006 | Dixon et al. | |
| 2006/0265747 A1 | 11/2006 | Judge | |
| 2006/0267802 A1 | 11/2006 | Judge et al. | |
| 2007/0002769 A1* | 1/2007 | Matityahu et al. | 370/255 |
| 2007/0056035 A1 | 3/2007 | Copley | |
| 2007/0078675 A1 | 4/2007 | Kaplan | |
| 2007/0079379 A1 | 4/2007 | Sprosts et al. | |
| 2007/0083929 A1 | 4/2007 | Sprosts et al. | |
| 2007/0107059 A1 | 5/2007 | Chasin et al. | |
| 2007/0130350 A1 | 6/2007 | Alperovitch et al. | |
| 2007/0130351 A1 | 6/2007 | Alperovitch et al. | |
| 2007/0162587 A1 | 7/2007 | Lund et al. | |
| 2007/0220607 A1 | 9/2007 | Sprosts et al. | |
| 2007/0244974 A1 | 10/2007 | Chasin | |
| 2007/0289015 A1 | 12/2007 | Repasi et al. | |
| 2008/0022384 A1 | 1/2008 | Yee et al. | |
| 2008/0133540 A1 | 6/2008 | Hubbard et al. | |
| 2008/0162265 A1 | 7/2008 | Sundaresan et al. | |
| 2008/0175226 A1 | 7/2008 | Alperovitch et al. | |
| 2008/0175266 A1 | 7/2008 | Alperovitch et al. | |
| 2008/0178259 A1 | 7/2008 | Alperovitch et al. | |
| 2008/0229422 A1 | 9/2008 | Hudis et al. | |
| 2008/0244744 A1 | 10/2008 | Thomas et al. | |
| 2008/0282338 A1 | 11/2008 | Beer | |
| 2009/0007102 A1 | 1/2009 | Dadhia et al. | |
| 2009/0150236 A1 | 6/2009 | Price | |
| 2009/0172818 A1 | 7/2009 | Sutherland et al. | |
| 2009/0178142 A1 | 7/2009 | Lieblich et al. | |
| 2009/0222877 A1 | 9/2009 | Diehl et al. | |
| 2009/0232300 A1 | 9/2009 | Zucker et al. | |
| 2009/0328209 A1 | 12/2009 | Nachenberg | |
| 2010/0077445 A1 | 3/2010 | Schneider et al. | |
| 2010/0223349 A1 | 9/2010 | Thorson | |
| 2010/0242082 A1 | 9/2010 | Keene et al. | |
| 2010/0306846 A1 | 12/2010 | Alperovitch et al. | |
| 2011/0040825 A1 | 2/2011 | Ramzan et al. | |
| 2011/0067086 A1 | 3/2011 | Nachenberg et al. | |
| 2011/0197275 A1 | 8/2011 | Chasin et al. | |
| 2011/0305141 A1* | 12/2011 | Horovitz | 370/241 |
| 2012/0096516 A1 | 4/2012 | Sobel et al. | |
| 2012/0174219 A1 | 7/2012 | Hernandez et al. | |
| 2012/0291087 A1 | 11/2012 | Agrawal | |
| 2013/0246925 A1* | 9/2013 | Ahuja et al. | 715/738 |
| 2013/0247201 A1 | 9/2013 | Alperovitch et al. | |
| 2013/0268994 A1 | 10/2013 | Cooper et al. | |

FOREIGN PATENT DOCUMENTS

| | | |
|---|---|---|
| KR | 10-2007-0065267 | 6/2007 |
| KR | 10-2008-0025207 | 3/2008 |
| WO | WO 2007/019521 | 2/2007 |
| WO | WO 2010/008825 | 1/2010 |
| WO | WO 2013/003493 | 1/2013 |
| WO | WO 2013/155239 A1 | 10/2013 |

OTHER PUBLICATIONS

USPTO Mar. 13, 2013 Response to Dec. 13, 2012 Nonfinal Office Action from U.S. Appl. No. 13/052,739.

USPTO Mar. 25, 2013 Final Office Action from U.S. Appl. No. 13/052,739.

USPTO Jul. 25, 2013 AFCP Response to Mar. 25, 2013 Final Office Action from U.S. Appl. No. 13/052,739.

USPTO Aug. 12, 2013 Advisory Action from U.S. Appl. No. 13/052,739.

USPTO Aug. 26, 2013 Request for Continued Examination and Response to Final Office Action mailed Mar. 25, 2013 from U.S. Appl. No. 13/052,739.

USPTO Sep. 13, 2013 Nonfinal Rejection from U.S. Appl. No. 13/443,865.

Josang, Audun et al., "A Survey of Trust and Reputation Systems for Online Service Provision," Decision Support Systems, 43(2), 2007, pp. 618-644, 43 pages.

International Search Report and Written Opinion for International Application No. PCT/US2013/036053 mailed Sep. 23, 2013, 14 pages.

USPTO Dec. 13, 2012 Nonfinal Office Action from U.S. Appl. No. 13/052,739.

Ford, R.; Allen, W.H., "Malware Shall Greatly Increase . . . ," Security & Privacy, IEEE, vol. 7, No. 6, pp. 69-71, Nov.-Dec. 2009.

Bonatti, Piero, et al., "An integration of reputation-based and policy-based trust management," networks 2.14 (2007): 10.

Kai Hwang; Kulkareni, S.; Yue Hu, "Cloud Security with Virtualized Defense and Reputation-Based Trust Management," Dependable, Autonomic and Secure Computing, 2009. DASC '09. Eighth IEEE International Conference on, vol., No., pp. 717-722, Dec. 12-14, 2009.

International Search Report and Written Opinion for International Application No. PCT/US2012/044453 mailed Jan. 14, 2013.

International Preliminary Report on Patentability for International Application No. PCT/US2013/044453, mailed Jan. 16, 2014, 10 pages.

Jamie Barnett, Reputation: The Foundation of Effective Threat Protection, McAfee, White Paper, 11 pages, copyright 2010, retrieved Apr. 16, 2012 from http://www.mcafee.com/us/resources/white-papers/wp-rep-effective-threat-protection.pdf.

McAfee GTI Reputation & Categorization Services, copyright 2003-2012, retrieved Apr. 16, 2012 from http://www.mcafee.com/us/mcafee-labs/technology/gti-reputation-technologies.aspx.

TrustedSource: The Next Generation Reputation System for Enterprise Gateway Security, McAfee, White Paper, copyright 2009 McAfee, Inc., 20 pages, retrieved Apr. 16, 2012 from http://www.mcafee.com/us/resources/white-papers/wp-trusted-source-next-gen-rep-sys.pdf.

U.S. Appl. No. 13/052,739, filed Mar. 21, 2011, entitled "System and Method for Malware and Network Reputation Correlation," Inventor(s) Dmitri Alperovitch.

U.S. Appl. No. 13/443,865, filed Apr. 10, 2012, entitled "System and Method for Determining and Using Local Reputations of Users and Hosts to Protect Information in a Network Environment," Inventor(s) Geoffrey Howard Cooper, et al.

Non-Final Office Action in U.S. Appl. No. 13/052,739 mailed on Sep. 2, 2014 (25 pages).

Final Office Action in U.S. Appl. No. 13/443,865 mailed on May 22, 2014 (19 pages).

Notice of Allowance in U.S. Appl. No. 13/443,865 mailed on Aug. 29, 2014 (12 pages).

International Preliminary Report on Patentability for International Application Serial No. PCT/US2013/036053 mailed on Oct. 14, 2014 (10 pages).

Korean Intellectual Property Office Notice of Preliminary Rejection in Korean Patent Applicaton Serial No. 10-2013-7034510 mailed on Dec. 4, 2014 (Translation) (3 pages).

(56) References Cited

OTHER PUBLICATIONS

European Patent Office Supplementary Search Report and Opinion in EP Application U.S. Appl. No. 12804840.2 mailed on Jan. 7, 2015 (6 pages).
Japan Patent Office Notice of Reasons for Rejection in JP Application Serial No. 2014-514938 mailed on Jan. 20, 2015 (2 pages).
Notice of Allowance in U.S. Appl. No. 13/052,739 mailed on Jan. 15, 2015 (18 pages).
U.S. Appl. No. 14/580,091, filed Dec. 22, 2014 and entitled System and Method for Determining and Using Local Reputations of Users and Hosts to Protect Information in a Network Environment, inventors Geoffrey Howard Cooper et al. (52 pages).
Notice of Allowance in U.S. Appl. No. 13/052,739 mailed on Apr. 22, 2015 (11 pages).

* cited by examiner

SYSTEM AND METHOD FOR PROTOCOL FINGERPRINTING AND REPUTATION CORRELATION

TECHNICAL FIELD

This specification relates in general to the field of network security, and more particularly, to a system and method for protocol fingerprinting and reputation correlation.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network operators. This obstacle is made even more complicated due to the continually evolving array of tactics exploited by malicious operators. Once a certain type of malicious software (e.g., a bot) has infected a host computer, a malicious operator may issue commands from a remote computer to control the malicious software. The software can be instructed to perform any number of malicious actions such as, for example, sending out spam or malicious emails from the host computer, stealing sensitive information from a business or individual associated with the host computer, propagating to other host computers, and/or assisting with distributed denial of service attacks. In addition, the malicious operator can sell or otherwise give access to other malicious operators, thereby escalating the exploitation of the host computers. Hence, significant challenges remain for developing innovative tools to combat tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes generating a fingerprint based on properties extracted from data packets received over a network connection and requesting a reputation value based on the fingerprint. A policy action may be taken on the network connection if the reputation value received indicates the fingerprint is associated with malicious activity. The method may additionally include displaying information about protocols based on protocol fingerprints, and more particularly, based on fingerprints of unrecognized protocols. In yet other embodiments, the reputation value may also be based on network addresses associated with the network connection.

Example Embodiments

Figure 1:
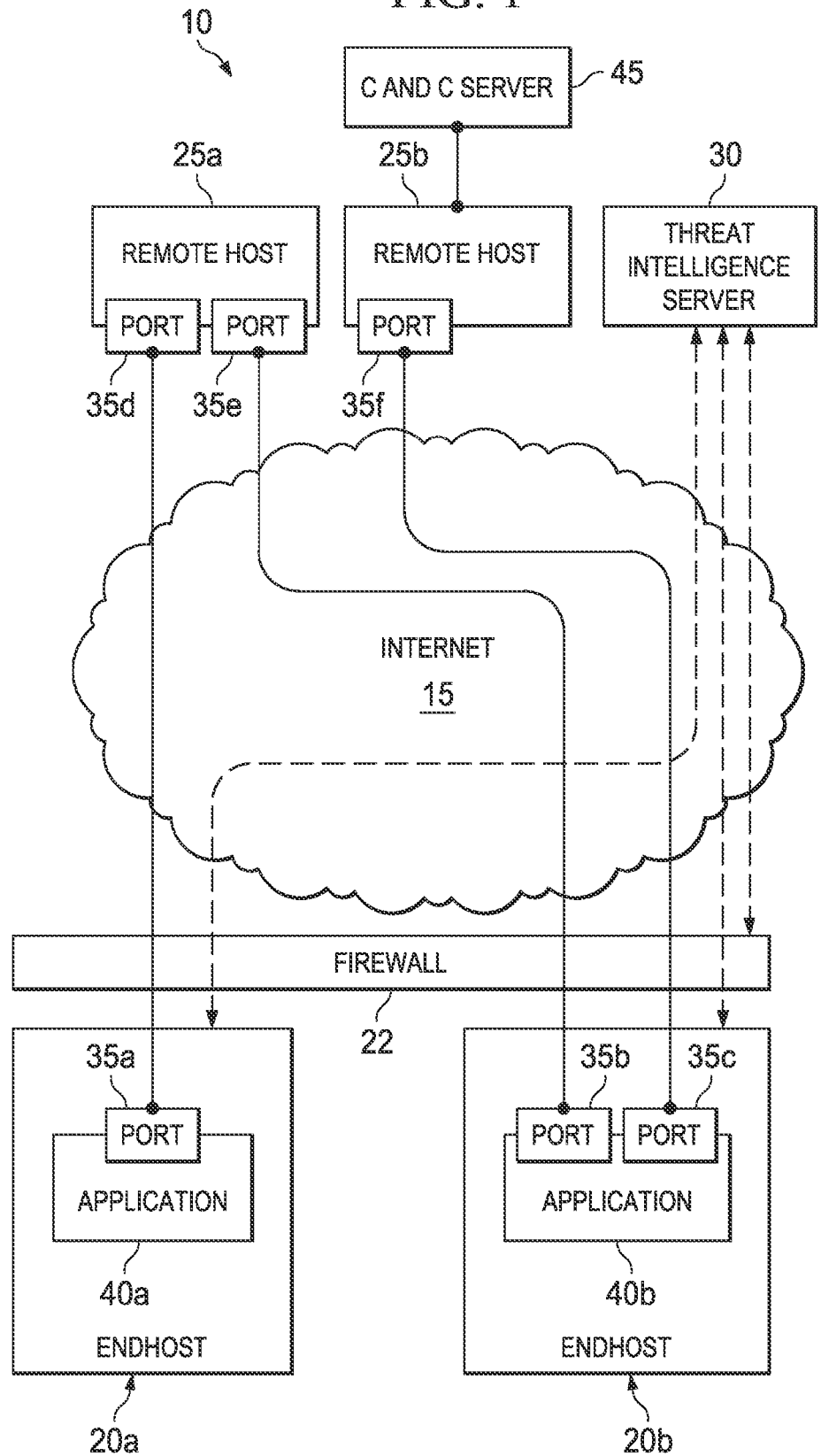
FIG. 1 is a simplified block diagram illustrating an example embodiment of a network environment in which protocols may be fingerprinted and correlated for network protection, in accordance with this specification.

Turning to FIG. 1, FIG. 1 is a simplified block diagram of an example embodiment of a network environment 10 in which protocols may be fingerprinted and correlated for network protection. Network environment 10 can include Internet 15, endhosts 20a and 20b, a firewall 22, remote hosts 25a and 25b, and a threat intelligence server 30. In general, endhosts 20a-b may be any type of termination point in a network connection, including but not limited to a desktop computer, a server, a laptop, a mobile telephone, or any other type of device that can receive or establish a network connection with a remote host, for example between any two ports 35a-f. Endhost 20a may execute applications 40a, and endhost 20b may execute application 40b, for example. Remote hosts 25a-b generally represent any type of computer or other device that may be compromised by malicious software ("malware"), which may be under the control of a computer or device, such as a command and control (C&C) server 45. Each of endhosts 20a-b, firewall 22, remote hosts 25a-b, threat intelligence server 30, and C&C server 45 may have associated Internet Protocol (IP) addresses.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. Network communications typically conform to certain protocols, which dictate procedures and formatting for exchanging messages between elements. Thus, network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs.

For purposes of illustrating the techniques of the system for network protection against malicious software, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks using, for example, the Internet to access web pages hosted on servers connected to the Internet, to send or receive electronic mail (i.e., email) messages, or to exchange files with end users or servers connected to the Internet. Malicious users are continuously developing new tactics that use the Internet to spread malware and gain access to confidential information.

Tactics that represent an increasing threat to computer security often include botnets, which have become a serious Internet security problem. In many cases they employ sophisticated attack schemes that include a combination of well-known and new vulnerabilities. Botnets generally use a client-server architecture where a type of malicious software (i.e., a bot) is placed on a host computer and communicates with a command and control server, which may be controlled by a malicious user (e.g., a botnet operator). Usually, a botnet is composed of a large number of bots that are controlled by the operator using a C&C protocol through various channels, including Internet Relay Chat (IRC) and peer-to-peer (P2P) communication. The bot may receive commands from the command and control server to perform particular malicious activities and, accordingly, may execute such commands. The bot may also send any results or pilfered information back to the command and control server.

Botnet attacks generally follow the same lifecycle. First, desktop computers are compromised by malware, often through drive-by downloads, Trojans, or un-patched vulnerabilities. The malware may then subvert these computers into bots, giving a botmaster control over them. Malware generally includes any software designed to access and/or control a computer without the informed consent of the computer owner, and is most commonly used as a label for any hostile, intrusive, or annoying software such as a computer virus, spyware, adware, etc. Once compromised, the computers may then be subverted into bots, giving a botmaster control over them. The botmaster may then use these computers for malicious activity, such as spamming. In addition to receiving commands to perform malicious activities, a bot also typically include one or more propagation vectors that enable it to spread within an organization's network or across other networks to other organizations or individuals. Common propagation vectors include exploiting known vulnerabilities on hosts within the local network and sending malicious emails having a malicious program attached or providing malicious links within the emails.

Existing firewall and network intrusion prevention technologies are not always capable of recognizing and containing botnets. Current firewalls may have the ability to detect and act on traffic associated with known applications. However, a large number of threats on a network, such as advanced persistent threats (APTs), use unknown communication mechanisms, including custom protocols, for example. Furthermore, it can be expected that existing firewalls may not be able to classify a sizeable amount of traffic on any given network with a standard set of application signatures. Thus, existing firewalls and other network intrusion prevention technologies are unable to implement any meaningful policy decisions on unrecognized traffic.

Some reputation systems can offer a viable defense to particular botnets. In general, a reputation system monitors activity and assigns a reputation value or score to an entity based on its past behavior. The reputation value may denote different levels of trustworthiness on the spectrum from benign to malicious. For example, a connection reputation value (e.g., minimal risk, unverified, high risk, etc.) may be computed for a network address based on network connections made with the address or email originating from the address. Connection reputation systems may be used to reject email or network connections with IP addresses having an unacceptable connection reputation, such as one that indicates an IP address is known or likely to be associated with malicious activity. Other reputation systems can block activity of applications having hashes known or likely to be associated with malicious activity. However, connection reputation lookups may be driven purely by network traffic and other reputation lookups may not consider any network traffic.

In accordance with one embodiment, network environment 10 can overcome these shortcomings (and others) by fingerprinting protocols and correlating reputation data. For example, network environment 10 may provide a mechanism for fingerprinting unrecognized protocols based on particular properties indicative of the protocol, and global threat intelligence (GTI) data can be used to guide policy decisions on traffic that uses the unrecognized protocols. Such GTI data can include protocol reputation, reputation of external addresses contacted, or geographic breakdown for unknown protocol traffic, for example.

More particularly, a protocol fingerprint may be generated for an unrecognized protocol on the network. An unrecognized protocol broadly includes protocols not already having a fingerprint or not associated with an application having an existing signature, for instance. A protocol fingerprint can be derived from properties extracted from the observed traffic using the protocol, and can be sent along with connection data to a threat intelligence server. The threat intelligence server may return a reputation value that is based on the connection data and the protocol fingerprint. Thus, protocol reputation can make information on unrecognized traffic flows actionable, including previously fingerprinted traffic flows and flows for which an application signature is available.

Figure 2:
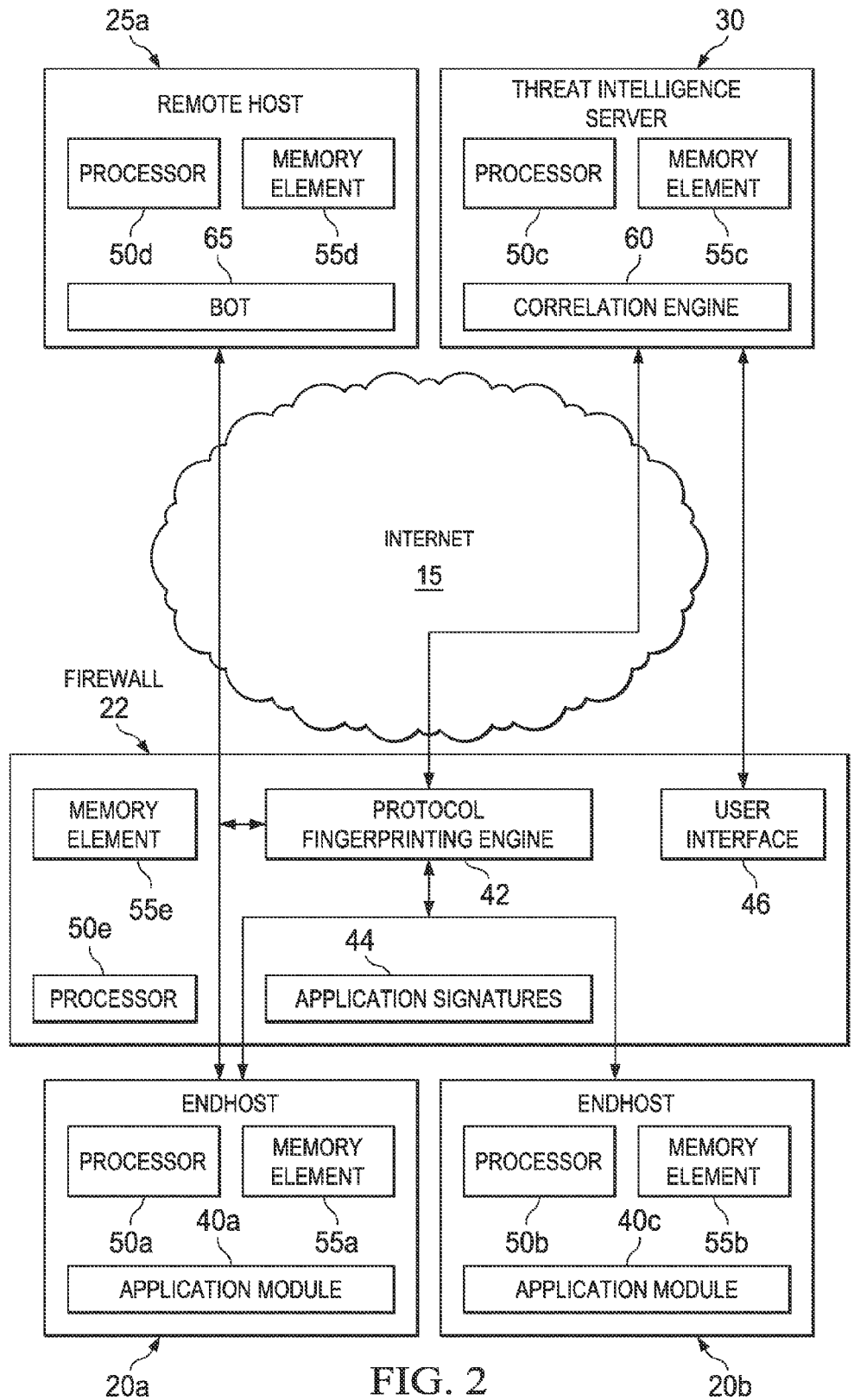
FIG. 2 is a simplified block diagram illustrating additional details that may be associated with one potential embodiment of the network environment, in accordance with this specification.

Turning to FIG. 2, FIG. 2 is a simplified block diagram illustrating additional details associated with one potential embodiment of network environment 10. FIG. 2 includes Internet 15, endhosts 20a-b, firewall 22, remote host 25a, and threat intelligence server 30. Each of these elements may include a respective processor 50a-e, a respective memory element 55a-e, and various software elements. More particularly, endhosts 20a-b may host application modules 40a-b, respectively. Firewall 22 may host protocol a fingerprinting engine 42, application signatures 44, and a user interface 46. A correlation engine 60 may be hosted by threat intelligence server 30, and a bot 65 may be hosted by remote host 25a.

In one example implementation, endhosts 20a-b, remote host 25a, and/or threat intelligence server 30 are network elements, which are meant to encompass network appliances, servers, firewalls, routers, switches, gateways, bridges, loadbalancers, processors, modules, or any other suitable device, component, element, or object operable to exchange information in a network environment. Firewall 22 may also be integrated or combined with another network element as appropriate. Network elements may include any suitable hardware, software, components, modules, interfaces, or objects that facilitate the operations thereof. This may be inclusive of appropriate algorithms and communication protocols that allow for the effective exchange of data or information. However, endhosts 20a-b generally may be distinguished from other network elements, as they tend to serve as a terminal point for a network connection, in contrast to a gateway or firewall. Endhosts are inclusive of wired and wireless network endpoints, such as desktop computers, laptop computers, tablet computers (e.g., iPads), e-book readers, mobile phones, smart phones (e.g., iPhones, Android phones, etc.) and other similar devices. Remote host 25a may similarly server as a terminal point for a network connection and may be inclusive of such devices.

In regards to the internal structure associated with network environment 10, each of endhosts 20a-b, firewall 22, remote host 25a, and/or threat analysis host 30 can include memory elements (as shown in FIG. 2) for storing information to be used in the operations outlined herein. Additionally, each of these devices may include a processor that can execute software or an algorithm to perform activities as discussed herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' The information being tracked or sent by endhosts 20a-b, firewall 22, remote host 25a, and/or threat intelligence server 30 could be provided in any database, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

In one example implementation, endhosts 20a-b, firewall 22, remote host 25a, and/or threat intelligence server 30 include software (e.g., as part of fingerprinting engine 42, etc.) to achieve, or to foster, operations as outlined herein. In other embodiments, such operations may be carried out externally to these elements, or included in some other network element to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, memory elements (as shown in FIG. 2) can store data used for the operations described herein. This includes the memory elements being able to store software, logic, code, or processor instructions that are executed to carry out the activities described herein. A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Figure 3:
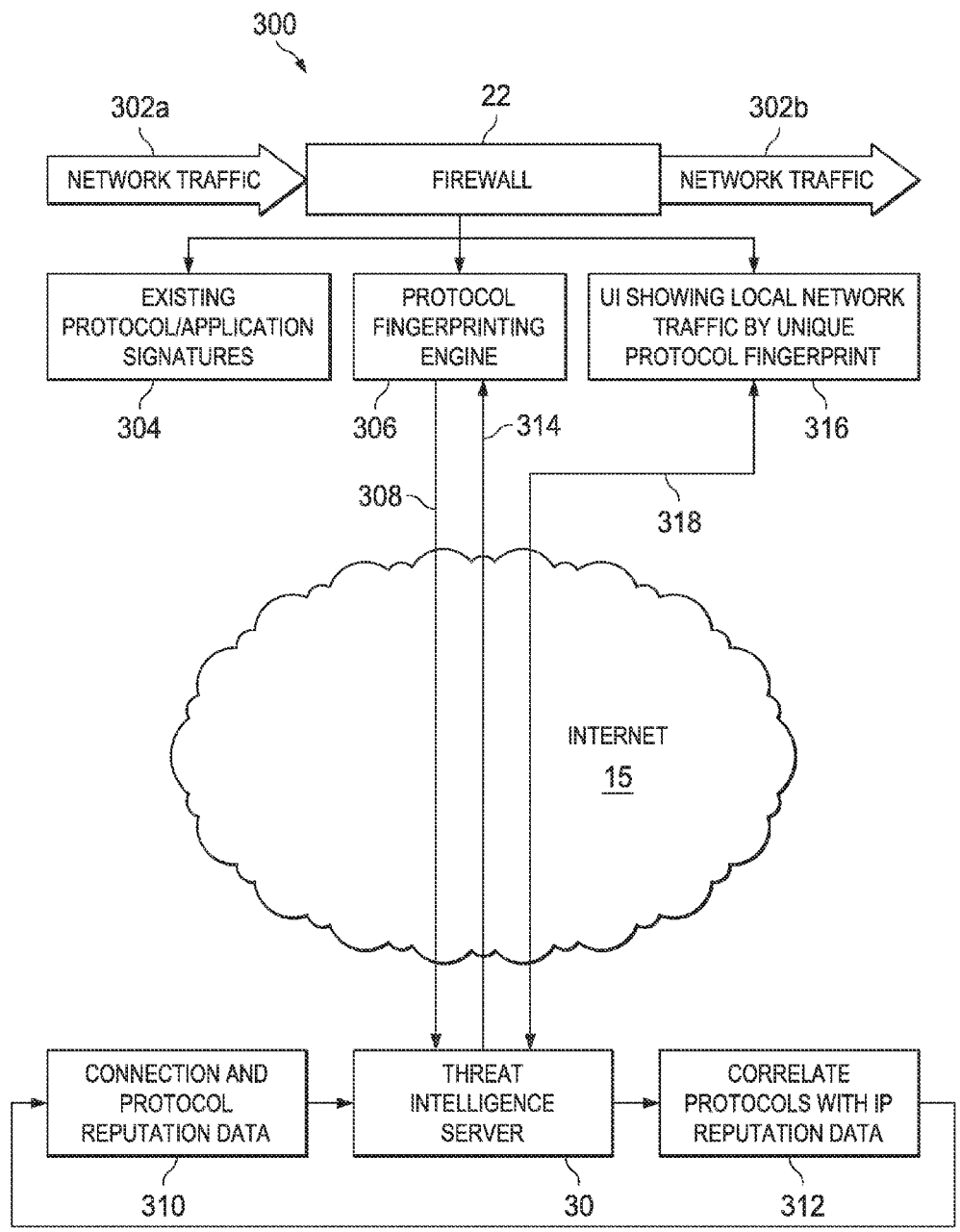
FIG. 3 is a simplified interaction diagram illustrating example operations that may be associated with one embodiment of the network environment, in accordance with this specification.

FIG. 3 is a simplified interaction diagram 300 illustrating example operations that may be associated with one embodiment of network environment 10. In general, firewall 22 may receive inbound network traffic 302a from remote nodes, such as remote host 25a; outbound network traffic 302b from local nodes, such as endhosts 20a-b; or internal network traffic, such as traffic between endhosts 20a-b. Network traffic 302a-b may be compared to existing protocol and/or application signatures at 304, and a fingerprint of unknown or unrecognized protocols may be generated at 306, by fingerprinting engine 42, for example. Known protocols may also be fingerprinted at 306 in some embodiments.

A fingerprint may be generated by extracting various behavior properties of traffic protocols observed on a network, such as inbound network traffic 302a and outbound network traffic 302b. For example, fingerprinting engine 42 may observe a number of data packets received over a network connection, and record the query/response ratio (e.g., by packet count and/or size) of the traffic as one fingerprint characteristic. Fingerprint engine 42 may also characterize the protocol as stream or message-based, based on properties such as packet size distribution, and record that information as a fingerprint characteristic. For example, large downloads in a stream-based protocol are likely to be broken into a large number of packets having the maximum packet size. In contrast, message-based streams are likely to be composed of smaller packets with variable sizes. Likewise, traffic may be characterized as ASCII or binary and incorporated into a fingerprint. Other examples of fingerprint properties include the transport protocol, the first token (e.g., "GET" in an ASCII protocol), first X number of bytes, the last X number of bytes of the first line, and the last token of the first line (e.g., "HTTP/1.1\r\n" for hypertext transfer protocol). Entropy (i.e., amount of randomness) of packet content is yet another example of a protocol property that can be observed and fingerprinted. Packets consisting mostly of English text, for instance, may have substantial redundancy, while a compressed or encrypted file may have very little redundancy and thus high entropy. Other distinguishing properties can include the first two bytes of packets (e.g., if they are length pointers), key-colon-value-newline formatting, Abstract Syntax Notation One (ASN.1) encoded data, order of exchange (i.e., client or server sends first message), numerical values as first bytes in a packet (e.g., "200 OK" for hypertext transfer protocol), messages that begin with a magic number, negotiation-before-stream pattern (e.g., small packets exchanged before streaming data), transaction identifiers (e.g., first two bytes from a client are same as first two bytes from the server), and type-length-value (TLV) or length-value (LV) format.

A reputation query may be transmitted at 308 to threat intelligence server 30, for example, across a network, such as Internet 15. Reputation query 308 may include connection data and the protocol fingerprint, for example. Connection data can include various parameters that identify the network connection, such as network addresses. Network addresses generally include data that identifies both the endhost and the remote end of the connection, such as the local (endhost) IP address and port and the remote host IP address and port. Threat intelligence server 30 may correlate the protocol fingerprint with reputation data 310 at 312, and return a response at 314.

The response at 314 may include a reputation value, which can denote different levels of trustworthiness on the spectrum from benign to malicious based on the reputation of the protocol fingerprint (i.e., a protocol reputation) and/or a network address associated with the connection (i.e., a connection reputation), and may further indicate whether a connection should be allowed. If the query response indicates that the connection is probably benign, then the connection can be allowed, but if the response indicates that the connection may be malicious, then appropriate policy action may be taken based on policy. For example, appropriate action may include blocking the connection, alerting a user or administrator, or recording the fingerprint and other network information in a log for subsequent forensic analysis.

Alternatively or additionally, at 316 a user interface may display information about all unknown protocols based on protocol fingerprints, as well as statistics on all known applications/protocols, which may be based on application signatures in certain embodiments. For example, if there are ten unique protocols with associated fingerprints, the user interface can display information on the unknown protocols. An administrator or other user may also transmit a query to threat intelligence server 30 through the user interface at 318 to retrieve additional data associated with the protocol fingerprint, thus further enriching the information with GTI data. For example, the query may retrieve global data for a protocol fingerprint, such as the geographic distribution of remote host addresses (i.e., in what countries are external IPs located that speak the unknown protocol), the reputation of remote host addresses using the unknown protocol (e.g., bad or unknown), and the number of sites reporting the unknown protocol (which may indicate whether the protocol is a local phenomenon or a targeted threat). Thus, as a more particular example, if an American bank fingerprints an unknown protocol and threat intelligence server 30 determines that the fingerprint is most frequently used by network addresses in Russia, then an administrator can block the unknown protocol based on this information. Moreover, as additional intelligence about the unknown protocol is collected, descriptive information and metadata can be associated with the protocol. For example, if an unknown protocol is seen by a firewall and submitted to a threat intelligence server, the threat intelligence server may alert the firewall or an administrator if the protocol is subsequently associated with an APT.

Note that with the examples provided above, as well as numerous other potential examples, interaction may be described in terms of two, three, or four network elements. However, this has been done for purposes of clarity and example only. In certain cases, it may be easier to describe one or more of the functionalities of a given set of operations by only referencing a limited number of network elements. It should be appreciated that network environment 10 is readily scalable and can accommodate a large number of components, as well as more complicated/sophisticated arrangements and configurations. Accordingly, the examples provided should not limit the scope or inhibit the broad teachings of network environment 10 as potentially applied to a myriad of other architectures. Additionally, although described with reference to particular scenarios, where a particular module, such as a fingerprinting engine, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible scenarios and patterns that may be executed by, or within, network environment 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining data packets received over a network connection at a firewall use an unrecognized protocol;
   extracting properties of the data packets that indicate the unrecognized protocol, wherein the properties include one or more properties associated with behaviors of the data packets and one or more properties associated with contents of the data packets, wherein the one or more properties associated with the contents of the data packets include entropy of the contents of the data packets;
   generating, by a hardware processor, a fingerprint based on the properties extracted from the data packets received over the network connection;
   requesting a reputation value based on the fingerprint; and
   taking a policy action on the network connection if the reputation value received indicates the fingerprint is associated with malicious activity.

2. The method of claim 1, further comprising storing the fingerprint in an audit log.

3. The method of claim 1, further comprising displaying information about a protocol based on the fingerprint.

4. The method of claim 1, wherein the reputation value is further based on a network address associated with the network connection.

5. The method of claim 1, wherein the reputation value is based on a protocol reputation associated with the fingerprint and on a connection reputation associated with the network connection.

6. The method of claim 1, wherein the reputation value is based on a protocol reputation associated with the fingerprint and correlated with a connection reputation associated with the network connection.

7. The method of claim 1, wherein the policy action comprises blocking the network connection.

8. The method of claim 1, wherein the policy action comprises alerting an administrator.

9. The method of claim 1, further comprising receiving an alert if the fingerprint is subsequently associated with malicious activity.

10. The method of claim 1, further comprising requesting global intelligence data associated with the fingerprint and displaying the global intelligence data based on the fingerprint.

11. Logic encoded in one or more non-transitory media that includes code for execution and when executed by one or more processors is operable to perform operations comprising:
    determining data packets received over a network connection at a firewall use an unrecognized protocol;
    extracting properties of the data packets that indicate the unrecognized protocol, wherein the properties are to include one or more properties associated with behaviors of the data packets and one or more properties associated with contents of the data packets, wherein the one or more properties associated with the contents of the data packets are to include entropy of the contents of the data packets;

generating a fingerprint based on the properties extracted from the data packets received over the network connection;
requesting a reputation value based on the fingerprint; and
taking a policy action on the network connection if the reputation value received indicates the fingerprint is associated with malicious activity.

12. The encoded logic of claim 11, wherein the operations further comprise storing the fingerprint in an audit log.

13. The encoded logic of claim 11, wherein the operations further comprise displaying information about a protocol based on the fingerprint.

14. The encoded logic of claim 11, wherein the reputation value is further based on a network address associated with the network connection.

15. The encoded logic of claim 11, wherein the reputation value is based on a protocol reputation associated with the fingerprint and on a connection reputation associated with the network connection.

16. The encoded logic of claim 11, wherein the reputation value is based on a protocol reputation associated with the fingerprint and correlated with a connection reputation associated with the network connection.

17. The encoded logic of claim 11, wherein the policy action comprises blocking the network connection.

18. The encoded logic of claim 11, wherein the policy action comprises alerting an administrator.

19. The encoded logic of claim 11, further comprising receiving an alert if the fingerprint is subsequently associated with malicious activity.

20. An apparatus, comprising:
a fingerprinting engine; and
one or more hardware processors operable to execute instructions associated with the fingerprinting engine, the one or more hardware processors being operable to perform operations comprising:
determining data packets received over a network connection by the apparatus use an unrecognized protocol;
extracting properties of the data packets that indicate the unrecognized protocol, wherein the properties are to include one or more properties associated with behaviors of the data packets and one or more properties associated with contents of the data packets, wherein the one or more properties associated with the contents of the data packets are to include entropy of the contents of the data packets;
generating a fingerprint based on the properties extracted from the data packets received over the network connection;
requesting a reputation value based on the fingerprint; and
taking a policy action on the network connection if the reputation value received indicates the fingerprint is associated with malicious activity.

21. The apparatus of claim 20, wherein the operations further comprise storing the fingerprint in an audit log.

22. The apparatus of claim 20, wherein the operations further comprise displaying information about a protocol based on the fingerprint.

23. The apparatus of claim 20, wherein the reputation value is further based on a network address associated with the network connection.

24. The apparatus of claim 20, wherein the reputation value is based on a protocol reputation associated with the fingerprint and on a connection reputation associated with the network connection.

25. The apparatus of claim 20, wherein the reputation value is based on a protocol reputation associated with the fingerprint and correlated with a connection reputation associated with the network connection.

26. The apparatus of claim 20, wherein the policy action comprises blocking the network connection.

27. The apparatus of claim 20, wherein the policy action comprises alerting an administrator.

28. The apparatus of claim 20, further comprising receiving an alert if the fingerprint is subsequently associated with malicious activity.

29. The apparatus of claim 20, the one or more hardware processors being operable to perform further operations comprising:
providing for display on a user interface information associated with the unrecognized protocol, wherein the information includes one or more of (1) a geographic distribution of remote host addresses associated with the unrecognized protocol, (2) a reputation of the remote host addresses, or (3) a number of sites reporting the unrecognized protocol.

30. The method of claim 1, further comprising:
providing for display on a user interface information associated with the unrecognized protocol, wherein the information includes one or more of (1) a geographic distribution of remote host addresses associated with the unrecognized protocol, (2) a reputation of the remote host addresses, or (3) a number of sites reporting the unrecognized protocol.

31. The encoded logic of claim 11, wherein the code, when executed by the one or more processors is operable to perform further operations comprising:
providing for display on a user interface information associated with the unrecognized protocol, wherein the information includes one or more of (1) a geographic distribution of remote host addresses associated with the unrecognized protocol, (2) a reputation of the remote host addresses, or (3) a number of sites reporting the unrecognized protocol.

* * * * *